(12) United States Patent
Nakano et al.

(10) Patent No.: US 12,186,971 B2
(45) Date of Patent: Jan. 7, 2025

(54) BIAXIALLY ORIENTED POLYESTER FILM AND METHOD FOR PRODUCING SAME

(71) Applicant: TOYOBO CO., LTD., Osaka (JP)

(72) Inventors: Mahiro Nakano, Inuyama (JP); Masayuki Haruta, Inuyama (JP)

(73) Assignee: TOYOBO CO., LTD., Osaka (JP)

( * ) Notice: Subject to any disclaimer, the term of this patent is extended or adjusted under 35 U.S.C. 154(b) by 542 days.

(21) Appl. No.: 17/291,372

(22) PCT Filed: Oct. 25, 2019

(86) PCT No.: PCT/JP2019/041983
§ 371 (c)(1),
(2) Date: May 5, 2021

(87) PCT Pub. No.: WO2020/095725
PCT Pub. Date: May 14, 2020

(65) Prior Publication Data
US 2022/0024111 A1 Jan. 27, 2022

(30) Foreign Application Priority Data

Nov. 7, 2018 (JP) ................................. 2018-209700
Nov. 7, 2018 (JP) ................................. 2018-209701

(51) Int. Cl.
| | | |
|---|---|---|
| B29C 55/14 | (2006.01) | |
| B29C 48/00 | (2019.01) | |
| B29C 48/08 | (2019.01) | |
| B29K 67/00 | (2006.01) | |
| B29L 31/00 | (2006.01) | |
| B29L 31/34 | (2006.01) | |
| C08K 3/36 | (2006.01) | |

(52) U.S. Cl.
CPC ........ *B29C 55/143* (2013.01); *B29C 48/0018* (2019.02); *B29C 48/08* (2019.02); *C08K 3/36* (2013.01); *B29C 2948/92704* (2019.02); *B29K 2067/003* (2013.01); *B29K 2995/0053* (2013.01); *B29L 2031/3475* (2013.01); *B29L 2031/712* (2013.01); *C08K 2201/002* (2013.01)

(58) Field of Classification Search
CPC ... B29C 55/143; B29C 48/0018; B29C 48/08; B29C 2948/92704; B29C 48/91; C08K 3/36; C08K 2201/002; B29K 2067/003; B29K 2995/0053; B29L 2031/3475; B29L 2031/712; B32B 2250/03; B32B 27/08; B32B 2250/244
See application file for complete search history.

(56) References Cited

U.S. PATENT DOCUMENTS

| | | | |
|---|---|---|---|
| 5,648,159 A | 7/1997 | Sato | |
| 6,180,209 B1 | 1/2001 | Sato et al. | |
| 10,928,572 B2 * | 2/2021 | Lee | ............ G02B 1/11 |
| 2002/0197496 A1 | 12/2002 | Mizutani et al. | |
| 2004/0009355 A1 | 1/2004 | Janssens et al. | |
| 2005/0287381 A1 | 12/2005 | Peiffer et al. | |
| 2015/0087762 A1 | 3/2015 | Nakagawa et al. | |
| 2015/0232611 A1 | 8/2015 | Manabe et al. | |
| 2019/0284433 A1 * | 9/2019 | Kolar | ............ C08J 7/0427 |
| 2019/0382515 A1 * | 12/2019 | Ochi | ............ B32B 27/08 |
| 2020/0094536 A1 * | 3/2020 | Toft | ............ B32B 23/06 |
| 2022/0040962 A1 * | 2/2022 | Kamada | ............ C08G 18/44 |

FOREIGN PATENT DOCUMENTS

| | | |
|---|---|---|
| EP | 1266923 A1 | 12/2002 |
| EP | 1380415 A1 | 1/2004 |
| JP | H07-186335 A | 7/1995 |
| JP | H07-333853 A | 12/1995 |
| JP | H11-040453 A | 2/1999 |
| JP | 2000-109576 A | 4/2000 |
| JP | 2001-018344 A | 1/2001 |
| JP | 2001-019773 A | 1/2001 |
| JP | 2001-171060 A | 6/2001 |
| JP | 2001-310434 A | 11/2001 |
| JP | 2003-175577 A | 6/2003 |
| JP | 2003-236926 A | 8/2003 |
| JP | 2004-123863 A | 4/2004 |
| JP | 2006-009025 A | 1/2006 |
| JP | 2008-095084 A | 4/2008 |
| JP | 2011-110718 A | 6/2011 |

(Continued)

OTHER PUBLICATIONS

European Patent Office, Extended European Search Report in European Patent Application No. 19881695.1 (Jul. 5, 2022).
China National Intellectual Property Administration, Office Action in Chinese Patent Application No. 201980071802.2 (Jun. 10, 2023).
European Patent Office, Communication Pursuant to Article 94(3) EPC in European Patent Application No. 19881695.1 (Jun. 5, 2023).
China National Intellectual Property Administration, Office Action in Chinese Patent Application No. 201980071802.2 (Dec. 2, 2022).
Japanese Patent Office, International Search Report in International Patent Application No. PCT/JP2019/041983 (Dec. 24, 2019).

(Continued)

*Primary Examiner* — Nahida Sultana
(74) *Attorney, Agent, or Firm* — Leydig, Voit & Mayer, Ltd.

(57) ABSTRACT

The present invention is to provide a method for producing a biaxially oriented polyester film that is superior in mechanical properties, transparency, and heat resistance, and at the same time, superior in secondary processing suitability and printing appearance. Disclosed is a biaxially oriented polyester film, having at least one surface satisfying the following requirements (1) and (2), and the film satisfying the following requirements (3) and (4). (1) A maximum peak height roughness (SRp) is 1.2 μm to 1.6 μm. (2) An arithmetic average roughness (SRa) is 0.024 μm to 0.045 μm. (3) A tensile strength in a longitudinal direction and a width direction is 180 MPa to 300 MPa. (4) A haze is 7% or less.

5 Claims, No Drawings

(56) References Cited

FOREIGN PATENT DOCUMENTS

| | | | |
|---|---|---|---|
| JP | 2011-148944 A | 8/2011 | |
| JP | 2012-212784 A | 11/2012 | |
| JP | 2015-108081 A | 6/2015 | |
| JP | 2015-174356 A | 10/2015 | |
| JP | 2015-199265 A | 11/2015 | |
| JP | 2016-000814 A | 1/2016 | |
| JP | 2016-191009 A | 11/2016 | |
| JP | 2017-013387 A | 1/2017 | |
| JP | 2017-100446 A | 6/2017 | |
| JP | 2018021168 * | 2/2018 | ............. B32B 27/36 |
| JP | 2018-083874 A | 5/2018 | |
| KR | 10-2009-0051264 A | 5/2009 | |
| KR | 10-2015-0081245 A | 7/2015 | |
| WO | 2013/146524 A1 | 10/2013 | |

OTHER PUBLICATIONS

Intellectual Property India, Examination Report in Indian Patent Application No. 202147022202 (Sep. 22, 2022).

European Patent Office, Communication Pursuant to Article 94(3) in European Patent Application No. 19881695.1 (Feb. 7, 2024).

Japan Patent Office, Office Action in Japanese Patent Application No. 2020-555961 (Jan. 13, 2022).

Taiwan Intellectual Property Office, Office Action in Taiwanese Patent Application No. 108138609 (Apr. 13, 2023).

Ishihara, "Fundamentals of Spinning and Film Forming, Part 3," *Molding and Processing*, 23(7): 430-440 (2011), machine English translation and JPO Notice of Submission of Opposition in JP 2022-103624 (Jan. 26, 2023) [identified as "Ko No. 6" therein].

Toshiro, "Film Forming Processing," *Textile Engineering*, 55(12): P464-P470 (2002), machine English translation and JPO Notice of Submission of Opposition in JP 2022-103624 (Jan. 26, 2023) [identified as "Ko No. 4" therein].

Yukio, "Manufacture of Polyester Films," Textiles & Industry, 31(2): P50-P55 (1975), machine English translation and JPO Notice of Submission of Opposition in JP 2022-103624 (Jan. 26, 2023) [identified as "Ko No. 3" therein].

Japan Patent Office, Notice of Submission of Opposition in Japanese Patent Application No. 2022-103624 (Jan. 26, 2023), English translation.

Japan Patent Office, Notice of Submission of Information by Third Parties in Japanese Patent Application No. 2022-103624 (Dec. 19, 2023), English translation.

Korean Intellectual Property Office, Office Action in Korean Patent Application No. 10-2021-7014577 (Sep. 25, 2024), machine English translation.

* cited by examiner

BIAXIALLY ORIENTED POLYESTER FILM AND METHOD FOR PRODUCING SAME

CROSS-REFERENCE TO RELATED APPLICATIONS

This patent application is the U.S. national phase of International Patent Application No. PCT/JP2019/041983, filed Oct. 25, 2019, which claims the benefit of Japanese Patent Application No. 2018-209700, filed Nov. 7, 2018, and Japanese Patent Application No. 2018-209701, filed Nov. 7, 2018, which are incorporated by reference in their entireties herein.

TECHNICAL FIELD

The present invention relates to a biaxially oriented polyester film. Particularly, the present invention relates to a biaxially oriented polyester film that is superior in mechanical properties, transparency, and heat resistance, and at the same time, superior in secondary processing suitability and printing appearance.

BACKGROUND ART

Polyester resins such as Polyethylene terephthalate (PET) and polybutylene telephthalate (PBT), which is a thermoplastic resin having superior heat resistance and mechanical properties, are widely used in various fields such as plastic films, electronics, energy, packaging materials, and vehicles. Among plastic films, a biaxially stretched PET film has good balance between costs and mechanical strength, heat resistance, dimension stability, chemical resistance, and optical properties, and therefore, is widely used in industrial and packaging fields.

In the field of industrial films, it can be used as functional films for flat panel displays such as liquid crystal displays thanks to its good transparency. PET films having hydrolysis resistance is also used as a film for a backsheet of solar battery, and it is used for various purposes as functional films and base films.

In the field of packaging films, it is used for packaging foods and used as gas barrier films. Especially films having superior gas barrier properties are used as airtight packaging materials for foods, pharmaceutical products, and electronic components, and also used as gas blocking materials, demands for which have recently grown.

However, polyester for films has problems including crinkles generated when films are wound to produce a film roll, adhesion between films when films are stacked to generate blocking, and defects such as flaws caused by bad sliding performance against a guide roll and the like when the film roll is processed.

In order to solve the problems in handling films, a method in which fine protrusions are formed on a surface of a polyester film is used.

As a method for producing a polyester film having a surface having a predetermined roughness, a technique in which inert particles such as inorganic particles are included in the polyester film is used. As a method to include inorganic particles and the like in a polyester film, a method where a polyester resin to which inorganic particles are added at a higher concentration than that of a final film (a masterbatch) is melt and mixed to a polyester resin that substantially has no inorganic particles is generally used.

On the other hand, a film having a rougher surface leads to missing printing after being printed, which deteriorates printing appearance.

Accordingly, a polyester film the surface of which has a predetermined roughness has been proposed.

On the other hand, recycle resins made from PET bottles and polyester resins made from biomass-derived materials are developed as eco-friendly or sustainable materials, and there is a call for a film containing such resins. In order to contain a lot of the above mentioned resins, a method where a masterbatch having a high concentration of inorganic particles is used is available, however, a higher concentration of inorganic particles generally causes agglomeration of the particles, which leads to further missing printing.

A conventional method to prevent agglomeration of inorganic particles where a size of particles, a concentration of inorganic particles in a masterbatch, and an adding amount of the masterbatch are set in a predetermined range is disclosed (for example, see patent document 1 etc.), however, coarse particles having a diameter of as large as 10 μm or more are contained, and missing printing is likely to occur, and such a method does not satisfy the requirement.

A method where inorganic particles are used to improve insulation resistance of film capacitors is also disclosed (for example, see patent document 2 etc.).

However, it still has problems in mechanical properties, transparency, heat resistance, printing properties, and appearance.

Another disclosure includes a method where both adhesiveness and detachability between a film and ceramic slurry are satisfied by controlling surface roughness and wettability of the film using a masterbatch including inorganic particles (for example, see patent document 3 etc.).

RELATED ART DOCUMENT

Patent Document

Patent Document 1: WO2013/146524
Patent Document 2: JP-A-H11-40453
Patent Document 3: JP-A-2018-83874

SUMMARY OF THE INVENTION

Problems to be Solved by the Invention

The present invention is to provide a method for producing a biaxially oriented polyester film that is superior in mechanical properties, transparency, and heat resistance, and at the same time, superior in secondary processing suitability and printing appearance.

Means for Solving the Problems

The present invention has the following constitutions to solve the above problems.

[1] A biaxially oriented polyester film, having at least one surface satisfying the following requirements (1) and (2), and the film satisfying the following requirements (3) and (4).
(1) A maximum peak height roughness (SRp) is 1.2 μm to 1.6 μm.
(2) An arithmetic average roughness (SRa) is 0.024 μm to 0.045 μm.
(3) A tensile strength in a longitudinal direction and a width direction is 180 MPa to 300 MPa.
(4) A haze is 7% or less.

[2] The biaxially oriented polyester film according to [1], wherein the at least one surface satisfying the requirements (1) and (2) has a diiodomethane contact angle of 29° or less.

[3] The biaxially oriented polyester film according to [1] or [2], comprising 500 to 1500 ppm by mass of inorganic particles.

[4] The biaxially oriented polyester film according to any one of [1] to [3], wherein the inorganic particles are silica particles.

[5] The biaxially oriented polyester film according to [4], wherein the silica particles have a pore volume of 0.6 ml/g to 2.0 ml/g.

[6] A film roll obtained by winding up the biaxially oriented polyester film according to any one of [1] to [5].

The present invention also has the following constitutions to solve the above problems.

[7] A method for producing a biaxially oriented polyester film, comprising mixing a polyethylene terephthalate-based resin containing 7000 ppm by mass or more and 22000 ppm by mass or less of first inorganic particles and a polyethylene terephthalate-based resin containing 0 to 50 ppm by mass of second inorganic particles to obtain a polyester resin composition containing 500 to 1500 ppm by mass of inorganic particles; melt extruding the polyester resin composition to obtain an unstretched sheet; biaxially stretching the unstretched sheet to obtain a biaxially stretched film; and heat setting the biaxially stretched film at a temperature of 200° C. or higher and 250° C. or lower, followed by relaxing the biaxially stretched film by 2% to 10% in a width direction while reducing the temperature to 200° C. or lower.

[8] A method for producing a biaxially oriented polyester film, comprising mixing a polyethylene terephthalate-based resin containing 7000 ppm by mass or more and 22000 ppm by mass or less of first inorganic particles and a polyethylene terephthalate-based resin containing 0 to 50 ppm by mass of second inorganic particles to obtain a first polyester resin composition containing 500 to 1500 ppm by mass of inorganic particles; melting the first polyester resin composition and a second polyester resin composition separately; extruding the first polyester resin composition and the second polyester resin composition through a die to obtain an unstretched sheet having a layer structure of a layer consisting of the first polyester resin composition/a layer consisting of the second polyester resin composition; biaxially stretching the unstretched sheet to obtain a biaxially stretched film; and heat setting the biaxially stretched film at a temperature of 200° C. or higher and 250° C. or lower, followed by relaxing the biaxially stretched film by 2% to 10% in a width direction while reducing the temperature to 200° C. or lower.

[9] A method for producing a biaxially oriented polyester film, comprising mixing a polyethylene terephthalate-based resin containing 7000 ppm by mass or more and 22000 ppm by mass or less of first inorganic particles and a polyethylene terephthalate-based resin containing 0 to 50 ppm by mass of second inorganic particles to obtain a first polyester resin composition containing 500 to 1500 ppm by mass of inorganic particles; melting the first polyester resin composition and a second polyester resin composition separately; co-extruding the first polyester resin composition and the second polyester resin composition through a die to obtain an unstretched sheet having a layer structure of a layer consisting of the first polyester resin composition/a layer consisting of the second polyester resin composition/a layer consisting of the first polyester resin composition; biaxially stretching the unstretched sheet to obtain a biaxially stretched film; and heat setting the biaxially stretched film at a temperature of 200° C. or higher and 250° C. or lower, followed by relaxing the biaxially stretched film by 2% to 10% in a width direction while reducing the temperature to 200° C. or lower.

[10] A method for producing a biaxially oriented polyester film, comprising mixing a polyethylene terephthalate-based resin containing 7000 ppm by mass or more and 22000 ppm by mass or less of first inorganic particles and a polyethylene terephthalate-based resin containing 0 to 50 ppm by mass of second inorganic particles to obtain a first polyester resin composition containing 500 to 1500 ppm by mass of inorganic particles; melting the first polyester resin composition, a second polyester resin composition, and a third polyester resin composition separately; co-extruding the first polyester resin composition, the second polyester resin composition, and the third polyester resin composition through a die to obtain an unstretched sheet having a layer structure of a layer consisting of the first polyester resin composition/a layer consisting of the second polyester resin composition/a layer consisting of the third polyester resin composition; biaxially stretching the unstretched sheet to obtain a biaxially stretched film; and heat setting the biaxially stretched film at a temperature of 200° C. or higher and 250° C. or lower, followed by relaxing the biaxially stretched film by 2% to 10% in a width direction while reducing the temperature to 200° C. or lower.

[11] The method for producing a biaxially oriented polyester film according to any one of [7] to [10], wherein the step of biaxially stretching the unstretched sheet comprises stretching the unstretched sheet in a longitudinal direction in two stages, and subsequently stretching the longitudinally stretched sheet in a width direction to obtain a biaxially stretched film.

[12] The method for producing a biaxially oriented polyester film according to any one of [7] to [11], wherein the first inorganic particles and the second inorganic particles are silica particles.

[13] The method for producing a biaxially oriented polyester film according to [12], wherein the silica particles have a pore volume of 0.6 ml/g to 2.0 ml/g, Effects of the Invention The present invention can provide the biaxially oriented polyester film that is superior in mechanical properties, transparency, and heat resistance, and at the same time, superior in secondary processing suitability and printing appearance.

MODE FOR CARRYING OUT THE INVENTION

Hereinafter, embodiments of the present invention will be described, however, the present invention is not limited by the following embodiments including examples, and can be certainly put into practice after various modifications within a range capable of accomplishing the objective of the present invention and meeting the gist of the invention.

(Polyethylene Terephthalate-Based Resin)

A biaxially oriented polyester film of the present invention has a polyethylene terephthalate-based resin as a constituent. The polyethylene terephthalate-based resin includes an ethylene glycol-derived component and a terephthalic acid-derived component as main constituents. "As main constituents" means that terephthalic acid is 80% by mole or more based on 100% by mole of the total dicarboxylic acid components, and ethylene glycol is 80% by mole or more based on 100% by mole of the total glycol components.

Other dicarboxylic acid components and other glycol components may be copolymerized without departing from the purpose of the present invention. The amount of copolymerization of other dicarboxylic acid components and other glycol components is less than 20% by mole based on 100% by mole of the total dicarboxylic acid components and 100% by mole of the total glycol components, respectively, more preferably 10% by mole or less, and especially preferably 5% by mole or less.

The above other dicarboxylic acid components include aromatic dicarboxylic acids such as terephthalic acid, isophthalic acid, phthalic acid, naphthalenedicarboxylic acid. 4,4'-biphenyldicarboxylic acid, and 5-sodium sulfoisophthalic acid; alicyclic dicarboxylic acids such as 1,4-cyclohexanedicarboxylic acid, 1,3-cyclohexanedicarboxylic acid, 1,2-cyclohexanedicarboxylic acid, 2,5-norbornenedicarboxylic acid, and tetrahydrophthalic acid; and aliphatic dicarboxylic acids such as oxalic acid, malonic acid, succinic acid, adipic acid, azelaic acid, sebacic acid, undecanedioic acid, dodecanedioic acid, octadecanedioic acid, fumaric acid, maleic acid, itaconic acid, mesaconic acid, citraconic acid, and dimer acid.

The above other glycol components include aliphatic glycols such as 1,2-propanediol, 1,3-propanediol, 1,2-butanediol, 1,3-butanediol, 1,4-butanediol, 2-methyl-1,3-propanediol, 2-amino-2-ethyl-1,3-propanediol, 2-amino-2-methyl-1,3-propanediol, 1,10-decanediol, dimethyloltricyclodecane, diethylene glycol, and triethylene glycol; alicyclic glycols such as bisphenol A, bisphenol S, bisphenol C, bisphenol Z, bisphenol AP, ethylene oxide or propylene oxide adduct of 4,4'-bisphenol, 1,2-cyclohexanedimethanol, 1,3-cyclohexanedimethanol, and 1,4-cyclohexanedimethanol; polyethylene glycol; and polypropylene glycol.

As polymerization methods of such polyethylene terephthalate-based resin, any producing method can be used including a direct polymerization process in which terephthalic acid and ethylene glycol, as necessary other dicarboxylic acid components and other glycol components are directly reacted; and a transesterification process in which dimethyl ester of terephthalic acid (as necessary, methyl esters of other dicarboxylic acids are included) and ethylene glycol (as necessary, other glycol components are included) are transesterified.

The polyethylene terephthalate-based resin preferably has an intrinsic viscosity of 0.30 dl/g to 1.20 dl/g, more preferably 0.50 dl/g to 1.00 dl/g, and even more preferably 0.55 dl/g to 0.90 dl/g. In a case where the intrinsic viscosity is less than 0.30 dl/g, an obtained polyester film is likely to be torn; in a case where the intrinsic viscosity is more than 1.20 dl/g, the filtration pressure increases and high precision filtration is difficult to be performed, so that it becomes difficult for the resin to be extruded through a filter. The polyester film resin preferably has an intrinsic viscosity of 0.30 dl/g to 1.20 dl/g, more preferably 0.45 dl/g to 0.95 dl/g, and even more preferably 0.50 dl/g to 0.85 dl/g. In a case the intrinsic viscosity is less than 0.30 dl/g, an obtained polyester film is likely to be torn; in a case where the intrinsic viscosity is more than 1.20 dl/g, the effect for improving mechanical properties is likely to be saturated.

The polyethylene terephthalate-based resin may be solution polymerized and then processed into chips, which is, as necessary, further solid state polymerized under heating and reduced pressure or in inert gas flow such as nitrogen.

As polyester resins, polyester resin obtained by recycling PET bottles made from the polyethylene terephthalate-based resin, or polyethylene terephthalate-based resin made from materials derived from biomass can be used.

Constituents of the biaxially oriented polyester film of the present invention may include other resins such as polyamide, polystyrene, polyolefin, and polyester other than the above, however, the content of the other resins is, based on the total resin components of the polyester film, preferably 30% by mass or less, even more preferably 20% by mass or less, and even more preferably 10% by mass or less, particularly preferably 5% by mass or less, and most preferably 0% by mass (All of the resin components constituting the polyester film is substantially polyethylene terephthalate-based resin), from a viewpoint of mechanical properties and heat resistance of the biaxially oriented polyester film.

(Inorganic Particles)

Constituents of the biaxially oriented polyester film of the present invention includes inorganic particles. The inorganic particles calcium carbonate, calcium phosphate, amorphous silica, crystalline glass filler, kaolin, talc, titanium dioxide, alumina, silica-alumina complex oxide particles, barium sulfate, calcium fluoride, lithium fluoride, zeolite, molybdenum sulfide, and mica. One, or two or more of the above may be selected to be used.

Of these, amorphous silica is preferred because it has a refractive index relatively close to that of the resin components, and void space is unlikely formed around amorphous silica particles, and it becomes easy for a film having high transparency to be obtained. Especially, the inorganic particles preferably consist of only amorphous silica particles.

In a case where the inorganic particles comprise one kind of particles, or in a case where the inorganic particles comprise two or more kinds of particles, main inorganic particles preferably have a mean particle diameter of 0.5 μm to 3.0 μm, more preferably 0.8 μm to 2.8 μm, and even more preferably 1.5 μm to 2.5 μm. When the mean particle diameter is 0.5 μm or more, surface asperity is easy to be formed and an arithmetic average roughness (SRa) on a surface of the film is easily allowed to be 0.024 μm or more, and sliding performance of the film is unlikely to deteriorate. When the mean particle diameter is 3.0 μm or less, a maximum peak height roughness (SRp) is easily allowed to be 1.6 μm or less. The mean particle diameter of the inorganic particles is measured with a laser diffraction particle size analyzer SALD-2200 manufactured by Shimadzu corporation. The inorganic particles may have any shape, however, preferably has nearly a spherical shape from a view point of slipperiness.

In the case the inorganic particles are amorphous silica, aggregates of particles having a mean primary particle diameter of 20 nm to 60 nm is preferable from a viewpoint of transparency, the reason of which is assumed to be that the surface layer can be flattened to become a stabilized shape through a stretching step and a heat setting step in the film producing process.

The aggregates of the particles preferably have a pore volume of 0.6 ml/g to 2.0 ml/g, more preferably 1.0 ml/g to 1.9 ml/g, and even more preferably 1.2 ml/g to 1.8 ml/g. When the pore volume is 0.6 ml/g or more, the maximum peak height roughness (SRp) is easily allowed to be 1.6 μm or less. On the other hand, when the pore volume is 2.0 ml/g or less, the inorganic particles are less likely to crash, and the maximum peak height roughness (SRp) is easily allowed to be 1.2 μm or more. Furthermore, void space is unlikely formed around the particles, and it becomes easy for a film having high transparency to be obtained.

First inorganic particles and second inorganic particles may be the same, or may be different from each other. For example, they may have the same composition, and may be different in one or more properties of particle diameter, particle size distribution, and pore volume.

(Additive Agent)

Other than the inorganic particles, constituents of the biaxially oriented polyester film of the present invention may include one or more additive agents including inert particles such as heat resistant polymer particles and crosslink polymer particles, fluorescent brighteners, UV blocking agents, infrared absorbing dye, heat stabilizers, electrostatic pinning agents, surfactants, and oxidant inhibitors. The oxidant inhibitors may include aromatic amine-based oxidant inhibitors and phenol-based oxidant inhibitors. The stabilizers may include phosphorus-based stabilizers such as phosphoric acid and phosphate ester-based stabilizers, sulfur-based stabilizers, and amine-based stabilizers.

The additive agents other than the inorganic particles may be added to the polyester resin from which a film is produced preferably at a ratio of 3% by weight or less, more preferably 2% by weight or less, and even more preferably 1% by weight or less.

(Method for Producing a Film)

Examples of specific constitutions of the biaxially oriented polyester film will be described, however, the present invention is not understood being limited thereto.

It is important that the biaxially oriented polyester film of the present invention consists of a composition including a mixture of a polyethylene terephthalate-based resin containing 7000 ppm by mass or more and 22000 ppm by mass or less of the first inorganic particles and a polyethylene terephthalate-based resin containing 0 to 50 ppm by mass of the second inorganic particles. The content of the first inorganic particles is preferably 7000 to 19000 ppm, more preferably 8000 to 17000 ppm, and especially preferably 9000 to 15000 ppm. In a case where the content of the first inorganic particles is less than 7000 ppm, the additive rate of the polyethylene terephthalate-based resin containing the first inorganic particles necessarily increases, and the maximum peak height roughness (SRp) is easily allowed to be 1.2 μm or more without excessively increasing the arithmetic average roughness (SRa). The additive rate of the polyethylene terephthalate-based resin containing 0 to 50 ppm by mass of the second inorganic particles is decreased. In a case where the content of the first inorganic particles is more than 22000 ppm, the maximum peak height roughness (SRp) is likely to become more than 1.6 μm.

The content of inorganic particles in the biaxially oriented polyester film of the present invention is preferably 500 ppm or more and 1500 ppm or less, more preferably 700 ppm or more and 1200 ppm or less, and particularly preferably 850 ppm or more and 1000 ppm or less. In a case where the content of the inorganic particles is more than 1500 ppm, agglomeration of the particles increases and the maximum peak height roughness (SRp) is likely to become more than 1.6 μm, which tends to lead to printing failure. On the other hand, in a case where the content of the inorganic particles is less than 500 ppm, the arithmetic average roughness (SRa) is likely to become less than 0.024, and handling properties and appearance of a roll tend to deteriorate, which includes increased crinkles due to poor air escape of the roll and decreased slipperiness.

Mixing rate of the polyethylene terephthalate-based resin containing 7000 ppm by mass or more and 22000 ppm by mass or less of the first inorganic particles and the polyethylene terephthalate-based resin containing 0 to 50 ppm by mass of the second inorganic particles in the biaxially oriented polyester film of the present invention, which is a ratio of the content of the polyethylene terephthalate-based resin containing 0 to 50 ppm by mass to the total of the mixture of the polyethylene terephthalate-based resin containing 7000 ppm by mass or more and 22000 ppm by mass or less of the first inorganic particles and the polyethylene terephthalate-based resin containing 0 to 50 ppm by mass, is preferably 65% by weight or more, more preferably 75% by weight or more, even more preferably 85% by weight or more, and particularly preferably 90% by weight or more.

Polyethylene terephthalate-based resin obtained by recycling PET bottles, polyethylene terephthalate-based resin made from materials derived from biomass, and polyethylene terephthalate-based resin including the additive agents as necessary can be included in the polyethylene terephthalate-based resin containing 0 to 50 ppm by mass of the second inorganic particles at a high proportion, and such resins can be utilized to the maximum.

The biaxially oriented polyester film of the present invention may have a single layer structure described above, and alternatively, may have a laminate structure having 2 layers, 3 layers, or 4 layers or more.

In the case where the biaxially oriented polyester film of the present invention has the laminate structure having 2 layers, it is important that one layer consists of a first polyester resin composition including a mixture of a polyethylene terephthalate-based resin containing 7000 ppm by mass or more and 22000 ppm by mass or less of the first inorganic particles and a polyethylene terephthalate-based resin containing 0 to 50 ppm by mass of the second inorganic particles. The content of the first inorganic particles is preferably 7000 ppm to 19000 ppm, more preferably 8000 ppm to 17000 ppm, and particularly preferably 9000 ppm to 15000 ppm.

In addition, it is important that the content of inorganic particles of the outermost layer of the one side is 500 ppm or more and 1500 ppm or less, preferably 700 ppm or more and 1200 ppm or less, and particularly preferably 850 ppm or more and 1000 ppm or less. In a case where the content of inorganic particles is more than 1500 ppm, agglomeration of the particles increases and the maximum peak height roughness (SRp) is likely to become more than 1.6 μm, which tends to lead to printing failure. On the other hand, in a case where the content of inorganic particles is less than 500 ppm, the arithmetic average roughness (SRa) is likely to become less than 0.024, and handling properties and appearance of a roll tend to deteriorate, which includes increased crinkles due to poor air escape of the roll and decreased slipperiness.

Constituents of the other layer may include a polyethylene terephthalate-based resin, inorganic particles, and as necessary, an additive agent, and a resin other than the polyethylene terephthalate-based resin, and the constituents of the other layer is not the same as those of the outermost layer of the one side.

In the case where the biaxially oriented polyester film of the present invention has the laminate structure having 3 layers, it is important that the outermost layer of the one side consists of the first polyester resin composition including a mixture of a polyethylene terephthalate-based resin containing 7000 ppm by mass or more and 22000 ppm by mass or less of the first inorganic particles and a polyethylene terephthalate-based resin containing 0 to 50 ppm by mass of the second inorganic particles. The content of the first inorganic particles is preferably 7000 ppm to 19000 ppm, more preferably 8000 ppm to 17000 ppm, and particularly preferably 9000 ppm to 15000 ppm.

In addition, it is important that the content of inorganic particles of the outermost layer of the one side is 500 ppm or more and 1500 ppm or less, preferably 700 ppm or more and 1200 ppm or less, and particularly preferably 850 ppm or more and 1000 ppm or less. In a case where the content of inorganic particles is more than 1500 ppm, agglomeration of the particles increases and the maximum peak height roughness (SRp) is likely to become more than 1.6 μm, which tends to lead to printing failure. On the other hand, in a case where the content of inorganic particles is less than 500 ppm, the arithmetic average roughness (SRa) is likely to become less than 0.028, and handling properties and appearance of a roll tend to deteriorate, which includes increased crinkles due to poor air escape of the roll and decreased slipperiness.

Constituents of the outermost layer of the other side may include a polyethylene terephthalate-based resin, inorganic particles, and as necessary, an additive agent, and a resin other than the polyethylene terephthalate-based resin, and the constituents of the outermost layer of the other side may be the same as or different from that of the outermost layer of the one side.

Constituents of the middle layer may include a polyethylene terephthalate-based resin, inorganic particles, and as necessary, an additive agent, and a resin other than the polyethylene terephthalate-based resin, as long as the constituents of the middle layer is not the same as those of the outermost layer of the one side. Even if the middle layer does not include inorganic particles, controlling the content of the inorganic particles of the outermost layer of the one side enables surface roughness of the film to be controlled, which is preferable because it can lead to reduced content of inorganic particles in the film in totality. It is preferable also because reduced content of inorganic particles leads to prevention of aroma tightness from deteriorating, while aroma components otherwise evaporate through voids formed at the boundary of the inorganic particles and the polyester resin.

In addition, it is advantageous in terms of produce cost, because it becomes easy for collected edge parts that are produced in producing processes and recycled materials in another film producing processes to be appropriately mixed to the middle layer as long as such mixing does not adversely affect the properties of the surface of the film.

The constituents of the outermost layer of the other side are preferably the same as those of the constituents of the outermost layer of the one side, which enables the production of the film to be easy.

In the case where the biaxially oriented polyester film of the present invention has the laminate structure having 4 layers, it is important that the outermost layer of the one side consists of the first polyester resin composition including a mixture of a polyethylene terephthalate-based resin containing 7000 ppm by mass or more and 22000 ppm by mass or less of the first inorganic particles and a polyethylene terephthalate-based resin containing 0 to 50 ppm by mass of the second inorganic particles. The content of the first inorganic particles is preferably 7000 to 19000 ppm, more preferably 8000 to 17000 ppm, and particularly preferably 9000 to 15000 ppm.

In addition, it is important that the content of inorganic particles in the outermost layer of the one side is 500 ppm or more and 1500 ppm or less, preferably 700 ppm or more and 1200 ppm or less, and particularly preferably 850 ppm or more and 1000 ppm or less. In a case where the content of the inorganic particles is more than 1500 ppm, agglomeration of the particles increases and the maximum peak height roughness (SRp) is likely to become more than 1.6 μm, which tends to lead to printing failure. On the other hand, in a case where the content of the inorganic particles is less than 500 ppm, the arithmetic average roughness (SRa) is likely to become less than 0.024, and handling properties and appearance of a roll tend to deteriorate, which includes increased crinkles due to poor air escape of the roll and decreased slipperiness.

Constituents of the outermost layer of the other side may include a polyethylene terephthalate-based resin, inorganic particles, and as necessary, an additive agent, and a resin other than the polyethylene terephthalate-based resin, and the constituents of the outermost layer of the other side may be the same as or different from that of the outermost layer of the one side.

Constituents of two middle layers may include a polyethylene terephthalate-based resin, inorganic particles, and as necessary, an additive agent, and a resin other than the polyethylene terephthalate-based resin, as long as the constituents of the two middle layer is not the same as those of the outermost layer of the one side. Even if the two middle layers does not include inorganic particles, controlling the content of the inorganic particles of the outermost layer of the one side enables surface roughness of the film to be controlled, which is preferable because it can lead to reduced content of inorganic particles in the film in totality. It is preferable also because reduced content of inorganic particles leads to prevention of aroma tightness from deteriorating, while aroma components otherwise evaporate through voids formed at the boundary of the inorganic particles and the polyester resin.

In addition, it is advantageous in terms of produce cost, because it becomes easy for collected edge parts that are produced in producing processes and recycled materials in another film producing processes to be appropriately mixed to the middle layers as long as such mixing does not adversely affect the properties of the surface of the film.

The constituents of the outermost layer of the other side are preferably the same as those of the constituents of the outermost layer of the one side, which enables the production of the film to be easy.

Mixing rate of the polyethylene terephthalate-based resin containing 7000 ppm by mass or more and 22000 ppm by mass or less of the first inorganic particles and the polyethylene terephthalate-based resin containing 0 to 50 ppm by mass of the second inorganic particles in the biaxially oriented polyester film of the present invention, which is a ratio of the content of the polyethylene terephthalate-based resin containing 0 to 50 ppm by mass to the total of the mixture of the polyethylene terephthalate-based resin containing 7000 ppm by mass or more and 22000 ppm by mass or less of the first inorganic particles and the polyethylene terephthalate-based resin containing 0 to 50 ppm by mass, is preferably 65% by weight or more, more preferably 75% by weight or more, even more preferably 85% by weight or more, and particularly preferably 90% by weight or more. Thereby, the present invention enables economical resins, recycled resins made from PET bottles, resins derived from biomass, and the like to be included in the film at large amounts, and can reap full advantage of properties of the resins.

However, when the polyethylene terephthalate-based resin containing large amount of inorganic particles is melt extruded, the inorganic particles are likely to agglomerate to produce inorganic particle aggregates having a large particle diameter.

Methods of adding inorganic particles to a polyethylene terephthalate-based resin includes, for example, a method where inorganic particles in slurry state are dispersed at a predetermined rate to ethylene glycol, which is a diol component, to obtain ethylene glycol slurry, and the ethylene glycol slurry is added in an arbitrary step before the completion of polyester polymerization.

In the process of adding inorganic particles, water sol or alcohol sol that is obtained in the process of producing the particles is preferably added without drying, which is preferable because dispersibility of the particles is kept good to prevent coarse protrusions from generating.

Next, Examples of a processing method of the biaxially oriented polyester film of the present invention into a film will be specifically described, however, the present invention should not be limited to the examples.

Pellets made of a polyethylene terephthalate-based resin containing 7000 ppm by mass or more and 22000 ppm by mass or less of first inorganic particles and pellets made of a polyethylene terephthalate-based resin containing 0 to 50 ppm by mass of second inorganic particles are mixed at a predetermined rate, which are supplied to a vent-type extruder to be melt extruded. At this time, the inside of the extruder is preferably set under flowing nitrogen atmosphere, and a temperature of the resin is preferably set at 265° C. to 295° C.

In the case where the biaxially oriented polyester film of the present invention has a laminate structure having 2 layers, 3 layers, or 4 layers or more, a multi-layering apparatus such as a multi-layer feedblock, a static mixer, a multi manifold die can be used.

For example, a method where thermoplastic resins discharged from different flow channels of two or more extruders are laminated into multi-layers with a feedblock, a static mixer, or a multi manifold die can be used. Alternatively, with one extruder, the above multi-layering apparatus can be introduced in a melt line between the extruder and a T-die.

A method where a static mixer and a gear pump are disposed in the polymer flow channel is preferable from the viewpoint of stabilization of back pressure and prevention of thickness variation.

Next, the mixed resin component is melt extruded, and filtered. Since foreign materials such as coarse gel generated by oxidation of the polyethylene terephthalate-based resin, and aggregates of the inorganic particles may cause flaws of an obtained film, it is effective to use a filter having ability to capture foreign materials of 25 µm or more at a rate of 95% or more. Depending on purpose of using the film, small foreign materials may be potential problems, and therefore, a filter having high capturing properties that preferably captures foreign materials of 10 µm or more at a rate of 95% or more is desirably used. If a filter having higher capturing properties than the above is used, filter pressure becomes substantially high, which leads to frequent replacement of the filter, and therefore, disadvantage in productivity and produce cost.

The kind of the filter is not particularly limited, however, stainless steel sintered materials is favorable because they have high removing properties of aggregates the main component of which is Si, Ti, Sb, Ge, and Cu derived from additives such as catalysts, as well as foreign materials such as gel. The filtering accuracy is preferably 100 µm or less, more preferably 80 µm or less, and particularly preferably 70 µm or less.

Subsequently, the melt mixed resin component is extruded from a slit die having a slit shape to a cooling roll to have a sheet shape, and cooled and solidified to obtain an unstretched sheet.

When being cooled on the cooling roll, the unstretched sheet of the mixed resin component is adhered to the surface of the cooling roll by a method including electrostatic application method where the unstretched sheet of the mixed resin component is adhered to the cooling roll with static electricity using high voltage electrodes, and then cooled and solidified.

The biaxially oriented polyester film of the present invention is biaxially oriented from the viewpoint of mechanical strength of the film, prevention of thickness variation, and processing suitability. Methods for stretching the unstretched sheet are exemplified by simultaneous biaxially stretching method and sequential biaxially stretching method, and the sequential biaxially stretching is preferable from the viewpoint of facility cost and productivity.

While an arithmetic average roughness of the surface of the film can be set not to be too high by controlling the content of inorganic particles in the film, in order to set a maximum peak height roughness of the surface of the film not to be too high, it is effective to deagglomerate aggregates of inorganic particles with inner stress of the film when the unstretched sheet is stretched.

Setting temperatures to be lower when the unstretched sheet is stretched, and multi-step stretching the unstretched sheet to improve inner stress of the film is effective to deagglomerate aggregates of particles.

If the inner stress of the film becomes too high, the inorganic particles sink into the inside of the film, and as a result, the arithmetic average roughness becomes small, which leads to low slipperiness of the film.

In addition, if the maximum peak height roughness becomes too large, it becomes difficult for air between films in a roll form to escape, and as a result, crinkles may be generated in the film roll. Furthermore, a larger number of voids are formed being originated from the inorganic particles due to stress, and a haze and aroma evaporation become higher. Therefore, the above conditions should be appropriately controlled.

The obtained unstretched sheet is introduced to a longitudinally stretching step, and heated at 40° C. to 140° C. in a preheating step. At this time, gradual heating is preferable, because rapid heating causes adhesion of the sheet to the cooling roll.

Subsequently, the sheet is longitudinally stretched, and methods for longitudinal stretching includes a roll stretching method and an IR stretching method, and are not particularly limited. A longitudinally stretched film is obtained by heating the sheet at 100° C. to 140° C. between a pair of rolls having different speed respectively, and stretching the sheet at a stretching ratio of 3.6 to 5.0 times, more preferably 3.8 to 4.7 times, and particularly preferably 4.0 to 4.7 times. At this time, infrared heaters may be placed as a supplementary heating apparatus at both sides of the film in a central part of the nip rolls to heat the film as necessary to control longitudinal stretching temperatures. The longitudinal stretching may be a single-stage stretching or a multi-stage stretching such as a two-stage stretching and a three-stage stretching.

In the case of the two-stage stretching, a stretching ratio of the first stage is preferably 1.1 to 3.2 times, and a stretching ratio of the second stage is preferably 1.1 to 3.2 times. In the case of the three-stage stretching, a stretching ratio of the first stage is preferably 1.1 to 1.5 times, a stretching ratio of the second stage is preferably 1.2 to 1.8 times, and a stretching ratio of the third stage is preferably 2.0 to 3.0 times.

Setting the heating temperature in the preheating step and the stretching step in the longitudinal direction low and stretching the film at a high stretching ratio can increase inner stress of the film to deagglomerate aggregates of inorganic particles. In addition, the multi-stage stretching, which can stretch the film facilitating oriented crystallization, enables the inner stress of the film to be increased. However, if the stretching ratio is set to be too high, the arithmetic average roughness becomes small, which leads to low slipperiness of the film. If the stretching ratio is set to be high, the mechanical properties of the film is improved, however, a tensile strength in the longitudinal direction of the obtained biaxially oriented polyester film is preferably controlled to be 300 MPa or less.

After surface treating the obtained longitudinally stretched film as necessary, which includes a corona treatment and a plasma treatment, application liquid may be applied to the one side of the longitudinally stretched film by a coating method to provide functions such as slipperiness, easy adhesion, and antistatic property.

Next, both end parts of the obtained longitudinally stretched film are clipped with clips, and the film is transversely stretched in the width direction at 100° C. to 160° C. at a stretching ratio of 3.9 to 5.0 times, more preferably 4.0 to 4.7 times, and particularly preferably 4.1 to 4.7 times to obtain a biaxially stretched film. At this time, like the longitudinal stretching, by setting the heating temperature in the transverse stretching low and stretching the film at a high stretching ratio to multi-stage stretching the film, the effect of deagglomeration of particle aggregates can be effectively obtained. However, if the stretching ratio is set to be too high, the arithmetic average roughness becomes small, which leads to low slipperiness of the film. If the stretching ratio is set to be high, the mechanical properties of the film is improved, however, a tensile strength in the width direction of the obtained biaxially oriented polyester film is preferably controlled to be 300 MPa or less.

After the transverse stretching, the biaxially stretched film is heat treated. The heat treatment can be performed by running the biaxially stretched film on a heated roll in an oven. The heat treatment is performed at a temperature of 120° C. or higher, which is within a range of lower than a peak temperature of crystal melting of a polyethylene terephthalate-based resin. The time of the heat treatment is preferably 1.6 to 20 seconds.

The highest temperature during the heat treatment is preferably a specified temperature in the range of 200° C. to 250° C., more preferably 210° C. to 245° C., and particularly preferably 220° C. to 245° C. The time of the heat treatment at the highest temperature is preferably 0.8 to 10 seconds, and more preferably 1 to 5 seconds.

Following the heat treatment at the highest temperature, transverse relaxing of the film in a cooling process from a higher temperature to a crystallization peak temperature can provide the effect of deagglomeration of inorganic particle aggregates with inner stress of the film.

For example, the biaxially stretched film may be heat treated at the highest temperature in the first half of the heat treatment step, and may be relaxed with decreased temperatures in the latter half of the heat treatment step. Alternatively, the biaxially stretched film may be heat treated at the highest temperature in the first stage of the heat treatment step, relaxed with decreased temperature in the second stage of the heat treatment step, and heat treated at a low temperature without relaxation in the third stage of the heat treatment step.

When decreasing the heat treatment temperature from the highest temperature, gradual decreasing is desirable. The gradual decreasing is preferably from the highest temperature to a specified temperature in the range of 120° C. to 210° C., more preferably to 130° C. to 200° C., and particularly preferably to 150° C. to 200° C.

The ratio of the relaxation treatment in the width direction is preferably 0.5 to 6.5%, more preferably 1.0 to 6.0%. In a case the ratio of the relaxation treatment in the width direction is less than 0.5%, the film exhibits bad thermal dimensional stability such as a heat shrinkage rate, which tends to lead to deviation or shrinkage of the film in the film processing process, and additionally tends to lead to no effect of deagglomeration of particle aggregates. On the other hand, in a case the ratio of the relaxation treatment in the width direction is more than 6.5%, sags tend to be generated in the film to lead to thickness variation. The time of the relaxation treatment is preferably 0.8 to 10 seconds, and more preferably 1 to 5 seconds. In a case where the time of the relaxation treatment is less than 0.8 seconds, the film tends to be broken. On the other hand, in a case where the time of the relaxation treatment is more than 10 seconds, sags tend to be generated in the film to lead to thickness variation.

Gradual decreasing the temperature after the temperature has reached the highest temperature can prevent the film from deformation due to rapid cooling, and effective for reduction in thickness variation and heat deformation.

The thickness of a layer consisting of a resin composition containing 500 ppm by mass to 1500 ppm by mass of inorganic particles, which is a mixture of a polyethylene terephthalate-based resin containing 7000 ppm by mass or more and 2200 ppm by mass or less of the first inorganic particles and a polyethylene terephthalate-based resin containing 0 to 50 ppm by mass of the second inorganic particles, of the biaxially oriented polyester film of the present invention is preferably 0.5 μm to 30 μm, more preferably 0.5 μm to 20 μm, even more preferably 0.5 μm to 10 μm, and more preferably 0.5 μm to 8 μm. If the layer thickness is 30 μm or less, it is easy for the arithmetic average roughness (SRa) of the surface of the film to become 0.024 μm or more.

The total film thickness of the biaxially oriented polyester film of the present invention is preferably 9 μm to 75 μm, more preferably 9 μm to 50 μm, and even more preferably 9 μm to 25 μm. When the total film thickness is 9 μm or more, it is easy for the stiffness of the film to be improved, which leads to easy processing of the film and less crinkles of the film roll. When the total film thickness is 75 μm or less, the stiffness can be kept from being too high, which leads less crinkles of the film roll.

(Film Properties)

It is important for the surface of the biaxially oriented polyester film of the present invention and the surface of the layer consisting of a resin composition containing 500 to 1500 ppm by mass of inorganic particles, which is a mixture of a polyethylene terephthalate-based resin containing 7000 ppm by mass or more and 22000 ppm by mass or less of the first inorganic particles and a polyethylene terephthalate-based resin containing 0 to 50 ppm by mass of the second inorganic particles, of the biaxially oriented polyester film of the present invention to satisfy the following properties of (1) and (2).

(1) A maximum peak height roughness (SRp) is 1.2 μm to 1.6 μm.
(2) An arithmetic average roughness (SRa) is 0.024 μm to 0.045 μm.

When the maximum peak height roughness (SRp) is 1.2 μm or less, it becomes easy for air between the films to escape when the film is formed to a roll, and crinkles and lines are less likely to be generated in the film roll. In addition, slipperiness of the film can be improved, and secondary processing such as printing can be easily performed, which is advantageous in terms of product quality and produce cost. When the maximum peak height roughness (SRp) is 1.6 μm or less, missing printing can be reduced to improve printing appearance, which is advantageous in terms of design, and at the same time, deviation is less likely to occur when the film is formed into a roll, which is advantageous in terms of easy storing and improved production efficiency. The maximum peak height roughness (SRp) is more preferably 1.2 μm to 1.5 μm, and even more preferably 1.2 μm to 1.4 μm.

When the arithmetic average roughness (SRa) is 0.024 μm or more, slipperiness of the film can be improved, and secondary processing such as printing is likely to be easily performed, which is advantageous in terms of product quality and produce cost. When the arithmetic average roughness (SRa) is 0.045 μm or less, missing printing can be reduced to improve printing appearance, which is advantageous in terms of design. The arithmetic average roughness (SRa) is preferably 0.024 μm to 0.040 μm, more preferably 0.024 μm to 0.035 μm.

It is important for the biaxially oriented polyester film of the present invention to satisfy the following properties of (3) and (4) as well as the above (1) and (2).

(3) A tensile strength in the longitudinal direction and the width direction is 180 MPa to 300 MPa.
(4) A haze is 7% or less.

Appropriately controlling the tensile strength and the haze can further improve secondary processing suitability and printing appearance.

When the tensile strength in the longitudinal direction and the width direction is 180 MPa or more, the film is less likely to be deformed and broken when tension is applied to the film in the processes, which is not limited to printing process. The tensile strength in the longitudinal direction and the width direction is preferably 190 MPa or more, more preferably 200 MPa or more, and particularly preferably 210 MPa or more.

When the tensile strength is 300 MPa or less, it is easy to set the stress not to be too high when an unstretched sheet or a longitudinally stretched film is stretched, and inorganic particles are less likely to sink into the inside of the film, roughness of the surface of the film is easily increased, and void space is unlikely formed around inorganic particles in the film to decrease the haze. The tensile strength is preferably 290 MPa or less, more preferably 280 MPa or less, and particularly preferably 270 MPa or less.

When the haze of the film is 7% or less, printing appearance is increased, and it becomes easy for the film to obtain sufficient quality because foreign materials can be easily detected with X-ray even in the process at high speed. The haze of the film is preferably 6% or less, ore preferably 5% or less, and particularly preferably 4% or less.

An intrinsic viscosity (IV) measured at 30° C. when the film is dissolved in a mixed solvent of phenol/1,1,2,2-tetrachloroethane at a mixing ratio of 6/4 (weight ratio) is preferably 0.5 g/dl to 0.7 g/dl.

A contact angle of the film surface measured by extruding 2 μL of diiodomethane from a needle having an outer diameter of 0.7 mm to the film surface that is to be measured under the condition of 20° C., 50% RH with "DropMaster 500" manufactured by Kyowa Interface Science Co., Ltd is preferably 29° or less, more preferably 28° or less, and even more preferably 27° or less. The measurement is performed ten times at different points respectively, and the average value is obtained. When the contact angle of the film surface is 29° or less, missing printing ink at 5% of halftone dot is easily decreased.

The time for air escape measured by the method described in the examples is preferably 14 seconds or less, more preferably 13 seconds or less, and even more preferably 12 seconds or less. When the time for air escape is 14 seconds or less, air can rapidly escape when the film is rolled up to form a film roll, and therefore, crinkles is less likely to be generated and deviate in the roll is decreased.

While slight crinkles are visually detected on the surface of a roll that is formed by rolling up the obtained biaxially oriented polyester film with the width of 800 mm and the length of 12000 m, the crinkles preferably go away when 20 N/m of tension is applied to the film while the film was drawn, and preferably no crinkles are detected on the film.

According to the printing evaluation by the method described in the examples, 95% or more of flawless dots is preferably printed, and more preferably 98% or more based on the total printing ink dots.

When the ratio of the polyethylene terephthalate-based resin containing 0 to 50 ppm by mass of inorganic particles is 80% by weight or more, the effect of environment-friendliness is improved when recycled polyester resin made from PET bottles, and a polyester resin made from biomass-derived material are used, which is preferable. The ratio is preferably 80% by weight or more, more preferably 85% by weight or more, and particularly preferably 90% by weight or more.

EXAMPLES (1) Composition of Polyethylene Terephthalate-Based Resin

By dissolving a polyethylene terephthalate-based resin and a film into hexafluoroisopropanol (HFIP), the content of residue composition of each monomer and diethylene glycol obtained as a by-product can be quantitatively determined with 1H-NMR and 13C-NMR. In the case of layered film, by scraping each layer from the film in accordance with the thickness of each layer, component of each layer can be obtained and measured.

(2) Intrinsic Viscosity of Polyethylene Terephthalate-Based Resin

The intrinsic viscosity was measured at 30° C. by dissolving a polyethylene terephthalate-based resin into phenol/1,1,2,2-tetrachloroethane at a mixing ratio of 6/4 (weight ratio).

(3) Glass Transition Temperature (Tg) and Melting Point (Tm) of Polyethylene Terephthalate-Based Resin The glass transition temperature (Tg) and the melting point (Tm) of polyethylene terephthalate-based resin was measured with 10 mg of sample at a ramp rate of 20° C./min. with a differential scanning calorimeter (DSC) manufactured by Seiko Instruments Inc. A beginning temperature of glass transition obtained from a DSC curve was determined to be the glass transition temperature, and a melting endothermic peak obtained from a DSC curve was determined to be the melting point.

(4) Film Thickness and Layer Thickness

A film was embedded in epoxy resin and a cross section of the film was cut out with a microtome. The cross section was observed with a transmission electron microscope (JEM2100 manufactured by JEOL Ltd.) to determine the film thickness and the thickness of the polyester layer.

(5) Content of Inorganic Particles in Each Layer of the Film

Scraping the layer that is to be measured, 1.0 L of o-chlorophenol was added to 0.9 g of the scraped sample, which was heated at 120° C. for 3 hours, and then centrifugal separated at 30,000 rpm for 40 minutes, and obtained particles were vacuum dried at 100° C. When the fine particles were measured with a DSC, in a case where a melting peak corresponding to a polymer was observed, o-chlorophenol was added to the fine particles, which was heated and cooled, and then centrifugal separated again. When it became obvious that the melting peak was not observed, the fine particles were defined as particles. Generally, two steps of centrifugal separation are enough. The ratio (ppm) of the obtained particles based on the total weight was determined to be the content of the inorganic particles.

(6) Content of Inorganic Particles in the Total Layers of the Film

The polyester film was measured with an X-ray fluorescence spectrometer (Supermini 200 manufactured by Rigaku Corporation), and the content of inorganic particles in the total layers of the film was obtained based on a predetermined calibration curve.

(7) Haze

The haze was measured in accordance with JIS K 7105 at 23° C. with a haze meter (300A manufactured by Nippon Denshoku Industries Co., Ltd.). The measurement was performed twice, and the average value was obtained.

(8) Tensile Strength of the Film

The tensile strength of the film was measured in accordance with JIS K 7127. A sample with a width of 10 mm and a length of 180 mm in the longitudinal direction and the width direction was cut out with a razor. The sample was left under the condition of 23° C., 65% RH for 12 hours, and then measured with Autograph AG5000A manufactured by Shimadzu corporation, at 23° C., 65% RH, with a chuck distance of 100 mm, at a pulling rate of 200 mm/min. The measurement was performed five times, and the average value was obtained.

(9) Static Friction Coefficient ($\mu s$)

A sample film was made by cutting out an area with a longitudinal length of 400 mm and a transverse length of 100 mm from the obtained film, which was aged under the atmosphere of 23° C., 65% RH for 12 hours. The sample was separated to a part for a chute having a longitudinal length of 300 mm and a transverse length of 100 mm and another part for a load having a longitudinal length of 100 mm and a transverse length of 100 mm. The sample for a chute was set to the chute, and the sample for a load was attached to a surface of a metal weight of 1.5 kg with a piece of tape, both of which were in contact with each other such that the chute and the load were opposite to each other. The static friction coefficient ($\mu s$) was measured at a pulling rate of 200 mm/min. under the condition of 23° C., 65% RH. The measurement was performed three times, and the average value was obtained. The static friction coefficient was measured with TENSILON RTG-1210 manufactured by A&D Company, Limited in accordance with JIS-7125.

The static friction coefficient of the film is preferably 0.15 to 0.8, more preferably 0.2 to 0.7, and even more preferably 0.25 to 0.7. In a case where the static friction coefficient is less than 0.15, the film becomes too slippery, and thus the shape of a roll cannot be maintained, and deviation occurs when the film is drawn during printing process, which leads to decrease in processing property. In a case where the static friction coefficient is more than 0.8, trouble is likely to occur including crinkles in a film roll and flaws of the film on a metal roll.

(10) SRa and SRp of the Surface of the Film

The surface roughness of the film was measured by the following method.

Confocal observation, instrument: scanning confocal laser microscope (Olympus LEXT)

Laser: 405 nm semiconductor laser, field lens: 50 times

Imaging mode: high accuracy

Using the above instrument and the condition, a confocal image of the surface that was measured was obtained.

Analysis of the Surface Roughness

Measurement range: a longitudinal length of 256 µm and a transverse length of 256 µm Analysis software: OLS4100

Cutoff: none

The surface roughness was analyzed under the above condition, and the arithmetic average roughness (SRa) and the maximum peak height roughness (SRp) were measured. The measurement was performed 10 times at different measurement sites, and the average value was obtained. Note that in a case where partial abnormality was detected, which was obviously a flaw or foreign materials, the measurement at the part in which the abnormality was detected was left out of consideration, and the measurement was again performed at the part in which such abnormality was not detected.

(11) Wetting Tension of the Film

A contact angle was measured by extruding 2 µL of diiodomethane from a needle having an outer diameter of 0.7 mm to the film surface that is to be measured under the condition of 20° C., 50% RH with "DropMaster 500" manufactured by Kyowa Interface Science Co., Ltd. The measurement was performed 10 times at different sites, and the average value was obtained.

(12) Time for Air Escape

As shown in FIG. 1, a film 4 was placed on a platform 1. Next, a holddown 2 was placed on the film 4 to fix the film 4 applying tensile force to the film 4. Next, a film 5 was placed on the holddown 2 so that another side of the film 5 than the upper side of the film 4 placed on the platform 1 was faced to the holddown 2. Next, a holddown 8 is placed on the film 5, and the holddown 8, the holddown 2, and the platform 1 were fixed to each other with a screw 3.

Subsequently, an opening 2a formed in the holddown 2 and a vacuum pump 6 were connected through a pipe 7 and a pore 2c formed in the holddown 2. Then, driving the vacuum pump 6, tensile force was applied to the film 5 since the film 5 was sucked to the opening 2a. At the same time, the surfaces of the film 4 and the film 5 that are faced to each other were depressurized through pores 2d formed circumferentially in the holddown 2, and the film 4 and the film 5 began to adhere to each other at the facing surfaces from the peripheral part.

How the films adhere to each other can be easily learned by observing interference stripes from above the overlapping films. While the interference stripes are generated at the peripheral part of the film 4 and the film 5 that are overlapping and then spread all over the overlapping surfaces and eventually stop, time (seconds) from the onset of the interference stripes to the end of spreading of the interference stripes is measured, and the tine is defined to be the time for air escape. The measurement was performed 5 times, each time replacing two films, and the average value was obtained. The shorter the time is, the better the rolling properties of the film is.

(13) Evaluation of Crinkles of Film Roll

The produced biaxially oriented polyester film was rolled up so that a film roll having a width of 800 mm and a length of 12000 m was obtained. Crinkles on the upper side of the film roll was visually observed and evaluated in accordance with the following standard. The films earned the rating of "excellent" and "good" were classified as qualified films.

Excellent: having no crinkles

Good: having slight crinkles, the crinkles vanishing when the film was drawn and tensile force was applied to the film Bad: having bold crinkles, the crinkles not vanishing when the film was drawn and tensile force was applied to the film

(14) Evaluation of Printing

Gravure printing was performed on the film at 5% of halftone and at a speed of 100 m/min. with a gravure printing machine (manufactured by Higashitani Tekkosho). As an ink, a mixture of an ink for gravure printing was used (trade name: FineStar R92 sumi black, manufactured by Toyo Ink Co., Ltd.) and a diluting solvent (trade name: SL302, manufactured by Toyo Ink Co., Ltd.) at a mixing ratio of 77:23. An area with a longitudinal length of 2 cm and a transverse length of 2 cm of the obtained printed sample was observed with an optical microscope, and evaluated in accordance with the following standard. Different 5 areas were observed for one sample, and the average of the evaluation was obtained.

Excellent: having 95% or more of immaculate dots based on the total ink dots

Good: having 90% or more and less than 95% of immaculate dots based on the total ink dots.

Bad: having less than 90% of immaculate dots based on the total ink dots.

(15) Ratio of Polyethylene Terephthalate-Based Resin Containing 0 to 50 ppm by Mass of Inorganic Particles A high use ratio of a recycled polyester resin made from PET bottles and a polyester resin made from biomass-derived materials used in the polyethylene terephthalate-based resin containing 0 to 50 ppm by mass of inorganic particles leads to higher effect on environmental friendliness. The environmental friendliness was evaluated based on the use ratio.

1. the use ratio of 90% by weight or more: Excellent
2. the use ratio of 85% by weight or more: Very good
3. the use ratio of 80% by weight or more: Good
4. the use ratio of 70% by weight or more: Fair
5. the use ratio of 65% by weight or more: Bad
6. the use ratio of less than 65% by weight: Very bad (Production of Polyethylene Terephthalate-Based Resin)

Polyethylene terephthalate-based resin used for producing a film was prepared as follows, (Polyethylene Terephthalate-Based Rein 1)

Magnesium acetate tetrahydrate salt was added to a mixture of terephthalic acid and ethylene glycol, which was esterified under a normal pressure at 255° C., subsequently to which antimony trioxide and trimethyl phosphate were added and reacted at 260° C. Then, the reaction product was transferred to a polycondensation reaction vessel, and the reaction system was heated and depressurized gradually to 133 Pa (1 mmHg), and the reaction product was polycondensation reacted under a reduced pressure at 280° C. by a general method to obtain polyester chips having IV of 0.62 dl/g, which was named polyethylene terephthalate-based resin 1. The obtained polyethylene terephthalate-based resin 1 had the composition of terephthalic acid component/isophthalic acid component//ethylene glycol component/diethylene glycol component of 100/0//98/2 (mole %), the glass transition temperature of 80° C., and the melting point of 255° C.

(Polyethylene Terephthalate-Based Resin 2)

Foreign materials such as residual drink were rinsed away from PET bottles for beverage use, and the PET bottles were shattered into flakes. The flakes were melted with an extruder, which was filtered with a filter and filtered again with a filter having a smaller size of opening to remove fine foreign materials, and further filtered again with a filter having a smallest opening size of 50 μm to obtain a recycled polyester material having IV of 0.70 dl/g, which was named polyethylene terephthalate-based resin 2. The polyethylene terephthalate-based resin 2 had the composition of terephthalic acid component/isophthalic acid component//ethylene glycol component/diethylene glycol component of 98/2//98/2 (mole %), the glass transition temperature of 76° C., and the melting point of 252° C.

(Polyethylene Terephthalate-Based Resin 3)

The same method used for producing the polyethylene terephthalate-based resin 1 oilier than using ethylene glycol extracted from plant-derived materials was used to obtain polyester chips having IV of 0.62 dl/g, which was named polyethylene terephthalate-based resin 3. The polyethylene terephthalate-based resin 3 had the composition of terephthalic acid component/isophthalic acid component//ethylene glycol component/diethylene glycol component of 100/0//98/2 (mole %), the glass transition temperature of 80° C., and the melting point of 255° C. Biomass degree of the polyester terephthalate-based resin 3 was measured with ASTMD6866, and the biomass degree was 17%.

(Polyethylene Terephthalate-Based Resin Containing Inorganic Particles)

(Polyethylene Terephthalate-Based Resin Containing Inorganic Particles 1)

When the polyethylene terephthalate-based resin 1 was prepared, ethylene glycol slurry of amorphous silica particles (trade name: Sylysia 310, manufactured by Fuji Sylysia chemical Ltd.) having the average particle diameter of 2.4 μm and pore volume of 1.6 ml/g was added to the polyethylene terephthalate-based resin 1 in the polycondensation reaction vessel so that the content of the silica was 7200 ppm in the polyethylene terephthalate-based resin 1, and polycondensation reaction was performed to obtain polyester chips having IV of 0.62, which was named polyethylene terephthalate-based resin containing inorganic particles 1.

(Polyethylene Terephthalate-Based Resin Containing Inorganic Particles 3)

The same method used for producing the polyethylene terephthalate-based resin containing inorganic particles 1 other than adding silica so that the content of the silica was 1500 ppm in the polyester to obtain polyester chips having IV of 0.62, which was named polyethylene terephthalate-based resin containing inorganic particles 2.

(Polyethylene Terephthalate-Based Resin Containing Inorganic Particles 3)

The same method used for producing the polyethylene terephthalate-based resin containing inorganic particles 1 other than adding silica so that the content of the silica was 12000 ppm in the polyethylene terephthalate-based resin 1 to obtain polyester chips having IV of 0.62, which was named polyethylene terephthalate-based resin containing inorganic particles 3.

(Polyethylene Terephthalate-Based Resin Containing Inorganic Particles 3)

The same method used for producing the polyethylene terephthalate-based resin containing inorganic particles 1 other than adding silica so that the content of the silica was 20000 ppm in the polyethylene terephthalate-based resin 1 to obtain polyester chips having IV of 0.62, which was named polyethylene terephthalate-based resin containing inorganic particles 4.

(Polyethylene Terephthalate-Based Resin Containing Inorganic Particles 5)

The same method used for producing the polyethylene terephthalate-based resin containing inorganic particles 1 other than adding silica so that the content of the silica was 23000 ppm in the polyethylene terephthalate-based resin 1 to obtain polyester chips having IV of 0.62, which was named polyethylene terephthalate-based resin containing inorganic particles 5.

(Polyester Resin Containing Additive Agent)
(Polyethylene Terephthalate-Based Resin Containing Additive Agent 1)

At the time when the esterification reaction vessel was heated to reach 200° C., a slurry containing 86.4 parts by mass of terephthalic acid and 64.4 parts by mass of ethylene glycol was placed in the vessel, to which 0.025 parts by mass of antimony trioxide and 0.16 parts by mass of triethylamine as catalysts were added with agitation. Subsequently, the vessel was heated and pressurized esterification reaction was performed at a gauge pressure of 0.34 MPa, at 240° C. Then, the pressure of the esterification reaction vessel was returned to a normal pressure, and 0.34 parts by mass of magnesium acetate tetrahydrate salt was added as a static pinning agent, and then 0.042 parts by mass of trimethyl phosphate was added. Furthermore, after the vessel was heated to 260° C. taking 15 minutes, 0.036 parts by mass of trimethyl phosphate, and then 0.0036 parts by mass of sodium acetate were added. The obtained esterification reaction product was transferred to a polycondensation reaction vessel, and the reaction system was gradually heated from 260° C. to 280° C. under a reduced pressure, and polycondensation reaction was performed at 285° C. After the polycondensation reaction, the obtained polycondensation reaction product was filtered with a filter made of stainless steel sintered body having a pore diameter of 5 μm (initial filtering efficiency 95%), and pelletized, which was named polyethylene terephthalate-based resin containing additive agents 1.

Example 1

As a material for a surface layer (A), a mixture of the polyethylene terephthalate-based resin 1/the polyethylene terephthalate-based resin containing inorganic particles 1/the polyethylene terephthalate-based resin containing additive agents 1 at the ratio of 76.5/12.5/11.0 (mass %) was used, and as a material for a base layer (B), a mixture of the polyethylene terephthalate-based resin 1/the polyethylene terephthalate-based resin containing inorganic particles 1/the polyethylene terephthalate-based resin containing additive agents 1 at the ratio of 84.1/4.9/11.0 (mass %) was used. Using two melt extruders, the mixture resin for the surface layer (A) was melt extruded from a first extruder at a resin temperature of 285° C., and the mixture resin for the base layer (B) was melt extruded from a second extruder at a resin temperature of 285° C. In each extruder, a filter that can capture foreign materials of 25 μm or more at the rate of 95% or more was used. The layers were joint laminated so that the order of the layers was the surface layer (A)/the base layer (B)/the surface layer (A) from the layer in contact with a cooling roll, and the thickness ratio in the T-die was 1/10/1 (μm), which was discharged to form a sheet on the cooling roll the temperature of which was set to 35° C. At that time, electricity was statically applied with a wire-shaped electrode having a diameter of 0.15 mm to adhere the sheet to the cooling roll to obtain a 3-layered unstretched film.

The obtained unstretched film was introduced to a longitudinally stretching preheating process, which was preheated with a group of rolls the temperatures of which were gradually increased from 70° C. to 134° C. Subsequently, the film was stretched in the longitudinal direction at a stretching ratio of 1.2 times between a pair of nip rolls heated to 134° C. having different speed. By the same method, the film was stretched at a stretching ratio of 1.5 times in the second stage, at a stretching ratio of 2.5 times in the third stage in the longitudinal direction, which means the total stretching was 4.5 times.

Next, with a transverse stretching machine of a tenter-type, the film was stretched at a stretching ratio of 4.3 times in a zone the temperatures of which was gradually increased from 143° C. to 154° C. Subsequently, heat treatment for heat fixing was performed so that the heat treatment consisted of the first half heat treatment and the second half heat treatment. In the first half heat treatment, the temperature was set to be 245° C., and the time for the heat treatment was 1.5 seconds; in the second half heat treatment, a plurality of zones were used so that the temperatures gradually decreased 227° C. to 150° C., and the time for the heat treatment was 2.3 seconds. In the second half heat treatment, the film was relaxed in the width direction at the ratio of 4.4%, and then cooled to a room temperature of about 23° C. to obtain a biaxially oriented polyester film the film thickness of which was 12 μm.

The film was evaluated as for the layer (A) that had been in contact with the cooling roll.

Example 2

In the same manner as the example 1 except using a mixture of the polyethylene terephthalate-based resin 1/the polyethylene terephthalate-based resin containing inorganic particles 1/the polyethylene terephthalate-based resin containing additive agents 1 at the ratio of 80.7/8.3//11.0 (mass %) for the surface layer (A), a biaxially oriented polyester film the film thickness of which was 12 μm was obtained. The film was evaluated in the same way as the example 1.

Example 3

In the same manner as the example 1 except using a mixture of the polyethylene terephthalate-based resin 1/the polyethylene terephthalate-based resin containing inorganic particles 1/the polyethylene terephthalate-based resin containing additive agents 1 at the ratio of 72.3/16.7/11.0 (mass %) for the surface layer (A), a biaxially oriented polyester film the film thickness of which was 12 μm was obtained. The film was evaluated in the same way as the example 1.

Example 4

In the same manner as the example 1 except the thickness of the base layer (B) of 14 μm, the heat treatment temperature and the treatment time in the first half of the heat fixing of 242° C. and 2 seconds respectively, and the treatment time in the second half of the heat fixing of 3 seconds, a biaxially oriented polyester film the film thickness of which was 16 μm was obtained. The film was evaluated in the same way as the example 1.

Example 5

In the same manner as the example 1 except using a mixture of the polyethylene terephthalate-based resin 1/the polyethylene terephthalate-based resin containing inorganic particles 3/the polyethylene terephthalate-based resin containing additive agents 1 at the ratio of 81.5/7.5/11.0 (mass %) for the surface layer (A), and a mixture of the polyethylene terephthalate-based resin 1/the polyethylene terephthalate-based resin containing inorganic particles 3/the polyethylene terephthalate-based resin containing additive agents 1 at the ratio of 86.1/2.9/11.0 (mass %) for the base layer (B), a biaxially oriented polyester film the film thickness of which was 12 μm was obtained. The film was evaluated in the same way as the example 1.

Example 6

In the same manner as the example 1 except using a mixture of the polyethylene terephthalate-based resin 2/the polyethylene terephthalate-based resin containing inorganic particles 1/the polyethylene terephthalate-based resin containing additive agent 1 at the ratio of 86.3/10.0/3.7 (mass %) for the base layer (B) as well as for the surface layer (A), which means that the obtained film had three layers having the same components, and altering the film processing condition as shown in table 1, a biaxially oriented polyester film the film thickness of which was 12 μm was obtained. In the example 6, the preheating temperature before the longitudinal stretching was constantly 75° C., and in the longitudinal stretching step, a two-stage stretching with IR was performed. The film was evaluated in the same way as the example 1.

Example 7

In the same manner as the example 1 except using a mixture of the polyethylene terephthalate-based resin 3/the polyethylene terephthalate-based resin containing inorganic particles 1/the polyethylene terephthalate-based resin containing additive agent 1 at the ratio of 85.0/10.4/4.6 (mass %) for the surface layer (A), a mixture of the polyethylene terephthalate-based resin 3/the polyethylene terephthalate-based resin containing inorganic particles 1/the polyethylene terephthalate-based resin containing additive agent 1 at the ratio of 93.6/1.4/5.0 (mass %) for the base layer (B), joint laminating the layers so that the thickness ratio in the T-die was 3/6/3 (μm), and altering the film processing condition as shown in the table 1, a biaxially oriented polyester film the film thickness of which was 12 μm was obtained. In the example 7, in the longitudinal stretching step, a two-stage stretching with rolls was performed. The film was evaluated in the same way as the example 1.

Comparative Example 1

In the same manner as the example 1 except using a mixture of the polyethylene terephthalate-based resin 1/the polyethylene terephthalate-based resin containing inorganic particles 1/the polyethylene terephthalate-based resin containing additive agent 1 at the ratio of 82.7/6.3/11.0 (mass %) for the surface layer (A), a biaxially oriented polyester film the film thickness of which was 12 μm was obtained. The film was evaluated in the same way as the example 1.

Comparative Example 2

In the same manner as the example 1 except using a mixture of the polyethylene terephthalate-based resin 1/the polyethylene terephthalate-based resin containing inorganic particles 1/the polyethylene terephthalate-based resin containing additive agent 1 at the ratio of 66.8/22.2/11.0 (mass %) for the surface layer (A), a biaxially oriented polyester film the film thickness of which was 12 μm was obtained. The film was evaluated in the same way as the example 1.

Comparative Example 3

In the same manner as the example 1 except using a mixture of the polyethylene terephthalate-based resin 3/the polyethylene terephthalate-based resin containing inorganic particles 1/the polyethylene terephthalate-based resin containing additive agent 1 at the ratio of 84.6/10.4/5.0 (mass %) for the surface layer (A), a mixture of the polyethylene terephthalate-based resin 3/the polyethylene terephthalate-based resin containing inorganic particles 1/the polyethylene terephthalate-based resin containing additive agent 1 at the ratio of 84.5/12.5/5.0 (mass %) for the base layer (B), joint laminating the layers so that the obtained film had two layers of the surface layer (A)/the base layer (A') having different components from the side of the surface that had been in contact with a chill roll, and the thickness ratio in the T-die was 11/1 (μm), and altering the film processing condition as shown in the table 1, a biaxially oriented polyester film the thickness of which was 12 μm was obtained. In the comparative example 3, the preheating temperature before the longitudinal stretching was constantly 78° C., and in the longitudinal stretching step, a one-stage stretching with IR was performed. The film was evaluated in the same way as the example 1.

Comparative Example 4

In the same manner as the example 1 except using a mixture the polyethylene terephthalate-based resin 1/the polyethylene terephthalate-based resin containing inorganic particles 5/the polyethylene terephthalate-based resin containing additive agents 1 at the ratio of 85.1/3.9/11.0 (mass %) for the surface layer (A), a mixture of the polyethylene terephthalate-based resin 1/the polyethylene terephthalate-based resin containing inorganic particles 5/the polyethylene terephthalate-based resin containing additive agents 1 at the ratio of 87.5/1.5/11.0 (mass %) for the base layer (B), a biaxially oriented polyester film the thickness of which was 12 μm was obtained. The film was evaluated in the same way as the example 1.

Comparative Example 5

In the same manner as the example 1 except altering the film processing condition as shown in the table 1, a biaxially oriented polyester film the thickness of which was 12 μm was obtained.

Comparative Example 6

In the same manner as the example 1 except using a mixture of the polyethylene terephthalate-based resin 1/the polyethylene terephthalate-based resin containing inorganic particles 2/the polyethylene terephthalate-based resin containing additive agents 1 at the ratio of 29.0/60.0/11.0 (mass %) for the surface layer (A), a mixture of the polyethylene terephthalate-based resin 1/the polyethylene terephthalate-based resin containing inorganic particles 2/the polyethylene terephthalate-based resin containing additive agents 1 at the ratio of 65.7/23.3/11.0 (mass %) for the base layer (B), and altering the film processing condition as shown in the table 1, a biaxially oriented polyester film the film thickness of which was 12 μm was obtained. In the comparative example 6, the preheating temperature before the longitudinal stretching was constantly 78° C., and in the longitudinal stretching step, a one-stage stretching with IR was performed. The film was evaluated in the same way as the example 1.

Comparative Example 7

In the same manner as the example 1 except using a mixture of the polyethylene terephthalate-based resin 1/the polyethylene terephthalate-based resin containing inorganic particles 3 in the ratio of 95.0/5.0 (mass %) for the base layer (B) as well as for the surface layer (A), which means that the obtained film had three layers having the same components, and altering the film processing condition as shown in the table 1, a biaxially oriented polyester film the film thickness of which was 100 μm was obtained. In the comparative example 7, the preheating temperature before the longitudinal stretching was constantly 100° C., and in the longitudinal stretching step, a one-stage stretching with rolls was performed, and the heat treatment temperature in the second half of the heat fixing was constantly 200° C. The film was evaluated in the same way as the example 1.

Comparative Example 8

In the same manner as the example 1 except using a mixture of the polyethylene terephthalate-based resin 1/the polyethylene terephthalate-based resin containing inorganic particles 4 at the ratio of 96.0/4.0 (mass %), joint laminating the layers so that the thickness ratio in the T-die was 2/16/2 (μm), and altering the film processing condition as shown in the table 1, a biaxially oriented polyester film the film thickness of which was 20 μm was obtained. In the comparative example 8, the preheating temperature before the longitudinal stretching was constantly 100° C., and in the longitudinal stretching step, a one-stage stretching with rolls was performed, the heat treatment temperature in the first half and the second half of the heat fixing was constantly 200° C. and 220° C. respectively, and the relaxing treatment was performed in both the first and the second heat treatment. The film was evaluated in the same way as the example 1.

As shown in the table 1, the evaluation of crinkles of film rolls and the evaluation of printing of the examples 1 to 7 were excellent or good, and the ratio of the main material of the polyester resin was 80% or more, which showed efficient resin properties.

The evaluation of the comparative examples 1 to 8 is shown in table 2. As for the comparative example 1, because of the low content of the inorganic particles in the layer (A), the film showed a decrease in both SRa and SRp, longer time for air escape, and bold crinkles in the roll.

As for the comparative example 2, because of the high content of the inorganic particles in the surface layer (A), the film showed an increase in both SRa and SRp, a large contact angle, and bad evaluation of printing.

The film obtained in the comparative example 3 showed an increase in both SRa and SRp, a large contact angle, and bad evaluation of printing, even though the content of the inorganic particles was in the appropriate range. The reason is considered that the inorganic particles in the inside of the film affected the surface roughness because the layer thickness of the surface layer (A) was thick, which led to large SRa and SRp, and the effect of deagglomeration of particle aggregates was not sufficient due to the one-stage longitudinal stretching and the high temperature in the relaxing treatment.

As for the comparative example 4, because of the high content of the inorganic particles in the master batch, which led to coarse protrusions, the film had increased SRp and bad evaluation of printing.

As for the comparative example 5, because of the low temperature and high stretching ratio in the longitudinal stretching and the transverse stretching, which led to high stress and sinking of the inorganic particles of the surface into the inside of the film, the film showed a decrease in both SRa and SRp. Therefore, the film was poor in air escape between the films, and had crinkles in the roll. In addition, the film had a lot of voids formed in the inside of the film beginning at the inorganic particles, and a large haze.

As for the comparative example 6, even though the effect of deagglomeration of particle aggregates was made to be small by decreasing the content of the inorganic particles in the master batch, longitudinally stretching at one stage, and increasing the temperature of the relaxing treatment, it is considered that since the film had small number of coarse protrusions, and low SRp, and therefore was poor in the time for air escape and the evaluation of crinkles in the roll.

As for the comparative example 7, because of the relatively high content of the inorganic particles in the master batch and the relatively low stretching ratio in the one-stage longitudinal stretching with rolls, the effect of deagglomeration of particle aggregates was insufficient, and the film was poor in the evaluation of printing due to coarse protrusions. In addition, since the thickness of the film was thick, the film had a large haze.

As for the comparative example 8, the effect of deagglomeration of particle aggregates was insufficient, and the film was poor in the evaluation of printing due to coarse protrusions, the reason is considered that the longitudinal and transverse stretching ratio was low, the longitudinal stretching was the one-stage with rolls, and the temperature of the relaxing treatment was high. Furthermore, the tensile strength in the longitudinal direction of the film was insufficient.

TABLE 1

| | | | | EXAMPLES | | | | | | |
|---|---|---|---|---|---|---|---|---|---|---|
| | | | | 1 | 2 | 3 | 4 | 5 | 6 | 7 |
| Film composition | | | — | A/B/A | A/B/A | A/B/A | A/B/A | A/B/A | A/A/A | A/B/A |
| Layer (A) | Polyethylene terephthalate-based resin containing inorganic particles | Ratio by weight in the film | weight % | 12.5 | 8.3 | 16.7 | 12.5 | 7.5 | 10.0 | 10.4 |
| | | Content of inorganic particles | ppm | 7200 | 7200 | 7200 | 7200 | 12000 | 7200 | 7200 |
| | Polyethylene terephthalate-based resin | Ratio by weight in the film | % | 76.5 | 80.7 | 72.3 | 76.5 | 81.5 | 86.3 | 85.0 |
| | | Content of inorganic particles | ppm | 0 | 0 | 0 | 0 | 0 | 0 | 0 |
| | Polyethylene terephthalate-based resin containing additive agents | Ratio by weight in the film | weight % | 11.0 | 11.0 | 11.0 | 11.0 | 11.0 | 3.7 | 4.6 |
| | | Content of inorganic particles | ppm | 0 | 0 | 0 | 0 | 0 | 0 | 0 |
| | Conent of inorganic particles | | ppm | 900 | 600 | 1200 | 900 | 900 | 720 | 750 |
| | Layer thickness | | μm | 1 | 1 | 1 | 1 | 1 | 12 | 3 |
| Layer (B) | Polyethylene terephthalate-based resin containing inorganic particles | Ratio by weight in the film | weight % | 4.9 | 4.9 | 4.9 | 4.9 | 2.9 | — | 1.4 |
| | | Content of inorganic particles | ppm | 7200 | 7200 | 7200 | 7200 | 12000 | — | 7200 |
| | Polyethylene terephthalate-based resin | Ratio by weight in the film | % | 84.1 | 84.1 | 84.1 | 84.1 | 86.1 | — | 93.6 |
| | | Content of inorganic particles | | 0 | 0 | 0 | 0 | 0 | — | 0 |
| | Polyethylene terephthalate-based resin containing additive agents | Ratio by weight in the film | weight % | 11.0 | 11.0 | 11.0 | 11.0 | 11.0 | — | 5.0 |
| | | Content of inorganic particles | | 0 | 0 | 0 | 0 | 0 | — | 0 |
| | Conent of inorganic particles | | ppm | 350 | 350 | 350 | 350 | 350 | — | 100 |
| | Layer thickness | | μm | 10 | 10 | 10 | 14 | 10 | — | 6 |
| Film thickness | | | μm | 12 | 12 | 12 | 16 | 12 | 12 | 12 |
| Temperature of melt extrusion | | | °C. | 285 | 285 | 285 | 285 | 285 | 285 | 275 |
| Preheating temperature in the longitudinal direction | | | °C. | 70~134 | 70~134 | 70~134 | 70~134 | 70~134 | 75 | 45~123 |
| Longitudinal stretching temperature | | | °C. | 134 | 134 | 134 | 134 | 134 | 110 | 126 |
| Longitudinal stretching ratio | | | times | 4.5 (1.2 × 1.5 × 2.5) | 4.5 (1.2 × 1.5 × 2.5) | 4.5 (1.2 × 1.5 × 2.5) | 4.5 (1.2 × 1.5 × 2.5) | 4.5 (1.2 × 1.5 × 2.5) | 3.8 (2.9 × 1.3) | 4.2 (1.4 × 3.0) |
| Longitudinal stretching method | | | — | 3-stage with rolls | 3-stage with rolls | 3-stage with rolls | 3-stage with rolls | 3-stage with rolls | 2-stage with IR | 2-stage with rolls |
| Transverse stretching temperature | | | °C. | 143~154 | 143~154 | 143~154 | 143~154 | 143~154 | 110~150 | 120~130 |
| Transverse stretching ratio | | | times | 4.3 | 4.3 | 4.3 | 4.3 | 4.3 | 4.5 | 4.4 |
| The highest temperature in heat treatment | | | °C. | 245 | 245 | 245 | 242 | 245 | 236 | 228 |
| Heat treatment time at the highest temperature | | | seconds | 1.5 | 1.5 | 1.5 | 2 | 1.5 | 1.6 | 1.6 |
| Final temperature at relaxing treatment | | | °C. | 150 | 150 | 150 | 150 | 150 | 190 | 190 |
| Relaxing time | | | seconds | 2.3 | 2.3 | 2.3 | 3.0 | 2.3 | 1.1 | 1.6 |
| Relaxing ratio | | | % | 4.4 | 4.4 | 4.4 | 4.4 | 4.4 | 4.2 | 5.2 |
| Cooling temperature | | | °C. | 23 | 23 | 23 | 23 | 23 | 23 | 23 |
| IV of the film | | | | 0.59 | 0.59 | 0.59 | 0.59 | 0.59 | 0.65 | 0.61 |
| Contact angle | | | ° | 25 | 24 | 27 | 24 | 27 | 26 | 24 |
| Haze | | | % | 2.4 | 2.2 | 2.6 | 2.6 | 2.7 | 2.5 | 2.3 |
| Tensile strength (MD/TD) | | | MPa | 235/230 | 230/225 | 230/220 | 245/240 | 235/230 | 215/235 | 245/260 |
| SRa of the surface of layer (A) | | | μm | 0.032 | 0.025 | 0.038 | 0.033 | 0.034 | 0.038 | 0.029 |
| Static friction coefficient (μs) | | | — | 0.44 | 0.48 | 0.38 | 0.41 | 0.43 | 0.43 | 0.44 |
| SRp of the surface of layer (A) | | | μm | 1.4 | 1.2 | 1.6 | 1.3 | 1.5 | 1.4 | 1.3 |
| Time for air escape | | | seconds | 9 | 14 | 8 | 9 | 8 | 10 | 13 |
| Evaluation of crinkles in the roll | | | — | Excellent | Good | Excellent | Excellent | Excellent | Excellent | Good |
| Evaluation of printing | | | — | Excellent | Excellent | Good | Excellent | Good | Excellent | Excellent |
| Environmental friendliness | | | — | 3 | 3 | 3 | 3 | 2 | 2 | 2 |

TABLE 2

| | | | | COMPARATIVE EXAMPLES | | | | | | | |
|---|---|---|---|---|---|---|---|---|---|---|---|
| | | | | 1 | 2 | 3 | 4 | 5 | 6 | 7 | 8 |
| Film composition | | | — | A/B/A | A/B/A | A/B | A/B/A | A/B/A | A/B/A | A/A/A | A/B/A |
| Layer (A) | Polyethylene terephthalate-based resin containing inorganic particles | Ratio by weight in the film | weight % | 6.3 | 22.2 | 10.4 | 3.9 | 12.5 | 60.0 | 5.0 | 4.0 |
| | | Content of inorganic particles | ppm | 7200 | 7200 | 7200 | 23000 | 7200 | 1500 | 12000 | 20000 |
| | Polyethylene terephthalate-based resin | Ratio by weight in the film | % | 82.7 | 66.8 | 84.6 | 85.1 | 76.5 | 29.0 | 95.0 | 96.0 |
| | | Content of inorganic particles | ppm | 0 | 0 | 0 | 0 | 0 | 0 | 0 | 0 |
| | Polyethylene terephthalate-based resin containing additive agents | Ratio by weight in the film | weight % | 11.0 | 11.0 | 5.0 | 11.0 | 11.0 | 11.0 | 0.0 | 0.0 |
| | | Content of inorganic particles | ppm | 0 | 0 | 0 | 0 | 0 | 0 | 0 | 0 |
| | Conent of inorganic particles | | ppm | 450 | 1600 | 750 | 900 | 900 | 900 | 800 | 800 |
| | Layer thickness | | μm | 1 | 1 | 11 | 1 | 1 | 1 | 100 | 2 |
| Layer (B) | Polyethylene terephthalate-based resin containing inorganic particles | Ratio by weight in the film | weight % | 4.9 | 4.9 | 12.5 | 1.5 | 4.9 | 23.3 | — | 4.9 |
| | | Content of inorganic particles | ppm | 7200 | 7200 | 7200 | 23000 | 7200 | 1500 | — | 7200 |
| | Polyethylene terephthalate-based resin | Ratio by weight in the film | % | 84.1 | 84.1 | 82.5 | 87.5 | 84.1 | 65.7 | — | 84.1 |
| | | Content of inorganic particles | ppm | 0 | 0 | 0 | 0 | 0 | 0 | — | 0 |
| | Polyethylene terephthalate-based resin containing additive agents | Ratio by weight in the film | weight % | 11.0 | 11.0 | 5.0 | 11.0 | 11.0 | 11.0 | — | 11.0 |
| | | Content of inorganic particles | ppm | 0 | 0 | 0 | 0 | 0 | 0 | — | 0 |
| | Conent of inorganic particles | | ppm | 350 | 350 | 900 | 350 | 350 | 350 | — | 350 |
| | Layer thickness | | μm | 10 | 10 | 1 | 10 | 10 | 10 | — | 16 |
| Film thickness | | | μm | 12 | 12 | 12 | 12 | 12 | 12 | 100 | 20 |
| Temperature of melt extrusion | | | °C. | 285 | 285 | 285 | 285 | 285 | 285 | 280 | 280 |
| Preheating temperature in the longitudinal direction | | | °C. | 70~134 | 70~134 | 78 | 70~134 | 70~90 | 78 | 100 | 100 |
| Longitudinal stretching temperature | | | °C. | 134 | 134 | 110 | 134 | 90 | 110 | 100 | 101 |
| Longitudinal stretching ratio | | | times | 4.5 (1.2 × 1.5 × 2.5) | 4.5 (1.2 × 1.5 × 2.5) | 3.7 | 4.5 (1.2 × 1.5 × 2.5) | 5.2 (1.2 × 1.5 × 2.7) | 3.7 | 3.5 | 3.1 |
| Longitudinal stretching method | | | — | 3-stage with rolls | 3-stage with rolls | 1-stage with IR | 3-stage with rolls | 3-stage with rolls | 1-stage with IR | 1-stage with rolls | 1-stage with rolls |
| Transverse stretching temperature | | | °C. | 143~154 | 143~154 | 119~142 | 143~154 | 90~130 | 119~142 | 120 | 115 |
| Transverse stretching ratio | | | times | 4.3 | 4.3 | 4.3 | 4.3 | 5.1 | 4.3 | 4.0 | 3.6 |
| The highest temperature in heat treatment | | | °C. | 245 | 245 | 244 | 245 | 245 | 244 | 260 | 200 |
| Heat treatment time at the highest temperature | | | seconds | 1.5 | 1.5 | 1.1 | 1.5 | 1.5 | 1.1 | 0.5 | 3.0 |
| Final temperature at relaxing treatment | | | °C. | 150 | 150 | 218 | 150 | 150 | 218 | 200 | 200 |
| Relaxing time | | | seconds | 2.3 | 2.3 | 1.1 | 2.3 | 2.3 | 1.1 | 23.0 | 7.0 |
| Relaxing ratio | | | % | 4.4 | 4.4 | 3.0 | 4.4 | 5.1 | 3.0 | 3.0 | 7.0 |
| Cooling temperature | | | °C. | 23 | 23 | 23 | 23 | 23 | 23 | 23 | 23 |
| IV of the film | | | μm | 0.59 | 0.59 | 0.59 | 0.59 | 0.59 | 0.59 | 0.58 | 0.61 |
| Contact angle | | | ° | 21 | 30 | 31 | 31 | 24 | 26 | 30 | 31 |
| Haze | | | % | 1.8 | 3.2 | 3.3 | 2.8 | 3.3 | 2.4 | 7.6 | 3.0 |
| Tensile strength (MD/TD) | | | MPa | 230/225 | 225/225 | 210/230 | 220/220 | 320/315 | 215/230 | 195/230 | 160/180 |
| SRa of the surface of layer (A) | | | μm | 0.022 | 0.046 | 0.050 | 0.038 | 0.023 | 0.030 | 0.035 | 0.027 |
| Static friction coefficient (μs) | | | — | 0.72 | 0.32 | 0.38 | 0.40 | 0.41 | 0.45 | 0.33 | 0.45 |
| SRp of the surface of layer (A) | | | μm | 0.8 | 2.3 | 2.1 | 2.7 | 1.1 | 1.1 | 1.8 | 2.0 |
| Time for air escape | | | seconds | 20 | 7 | 11 | 7 | 16 | 15 | 7 | 8 |
| Evaluation of crinkles in the roll | | | — | Bad | Excellent | Excellent | Excellent | Bad | Bad | Excellent | Excellent |
| Evaluation of printing | | | — | Excellent | Bad | Bad | Bad | Excellent | Excellent | Bad | Bad |
| Environmental friendliness | | | — | 3 | 3 | 3 | 2 | 3 | 6 | 1 | 2 |

INDUSTRIAL APPLICABILITY

The present invention can provide a biaxially oriented polyester film that is superior in mechanical properties, transparency, and heat resistance, and at the same time, superior in secondary processing suitability and printing appearance, a method for producing the same, and a film roll obtained by winding up the biaxially oriented polyester film.

The film is useful in the field of industrial films and the field of packaging films especially for packaging foods and for usage of gas barrier films, and the film can efficiently take advantage of properties of the resin because the content ratio of economical resins, recycled resins, and resins such as biomass resin can be increased. Especially, since reduction of environmental burdens has recently been a major public concern, the present invention can be one of efficient measures that can address the needs, and its value is considered to be high.

The invention claimed is:

1. A biaxially oriented polyester film,
   wherein the biaxially oriented polyester film is a biaxially stretched film having a single layer structure or a laminate structure comprising multiple layers, and the single layer or each layer of the laminated structure consists of a polyester resin composition,
   wherein the biaxially oriented polyester film has at least one outer surface satisfying both the following requirements (1) and (2), and the biaxially oriented polyester film satisfies both the following requirements (3) and (4):
   (1) a maximum peak height roughness (SRp) of 1.2 μm to 1.6 μm,
   (2) an arithmetic average roughness (SRa) of 0.024 μm to 0.045 μm,
   (3) a tensile strength in a longitudinal direction and a width direction of 180 MPa to 300 MPa, and
   (4) a haze of 7% or less as measured in accordance with JIS K 7105 at 23° C., and
   wherein the at least one outer surface of the biaxially stretched film satisfying both the requirements (1) and (2) has a diiodomethane contact angle of 29° or less.

2. The biaxially oriented polyester film according to claim 1, comprising 500 to 1500 ppm by mass of inorganic particles.

3. The biaxially oriented polyester film according to claim 2, wherein the inorganic particles are silica particles.

4. The biaxially oriented polyester film according to claim 3, wherein the silica particles have a pore volume of 0.6 ml/g to 2.0 ml/g.

5. A film roll obtained by winding up the biaxially oriented polyester film according to claim 1.

* * * * *